United States Patent
Siegel et al.

(10) Patent No.: US 7,840,576 B1
(45) Date of Patent: Nov. 23, 2010

(54) FLEXIBLE RULE-BASED INFRASTRUCTURE FOR DISCUSSION BOARD MAINTENANCE

(75) Inventors: Hilliard B. Siegel, Seattle, WA (US); Colin J. Needham, Bristol (GB)

(73) Assignee: IMDb.com, Inc., Seattle, WA (US)

( * ) Notice: Subject to any disclaimer, the term of this patent is extended or adjusted under 35 U.S.C. 154(b) by 0 days.

(21) Appl. No.: 12/756,112

(22) Filed: Apr. 7, 2010

Related U.S. Application Data (63) Continuation of application No. 11/613,140, filed on Dec. 19, 2006, now Pat. No. 7,720,853.

(51) Int. Cl.
G06F 17/30 (2006.01)
(52) U.S. Cl. ..................... 707/755; 705/319
(58) Field of Classification Search .......... 707/755; 705/319
See application file for complete search history.

(56) References Cited

U.S. PATENT DOCUMENTS

| | | | |
|---|---|---|---|
| 6,275,811 | B1 | 8/2001 | Ginn |
| 6,341,292 | B1 | 1/2002 | Cho |
| 6,438,632 | B1 | 8/2002 | Kikugawa |
| 6,571,234 | B1 | 5/2003 | Knight |
| 6,892,179 | B1 | 5/2005 | Zacharia |
| 2004/0102993 | A1 | 5/2004 | Yoshida |
| 2004/0111467 | A1 | 6/2004 | Willis |
| 2004/0172405 | A1 | 9/2004 | Farran |

OTHER PUBLICATIONS

"SA Forums > Main > General Bullshit > Ease up on the trigger finger there, forum desperdos [sic]!" Something Awful LLC, <http://forums.somethingawful.com/showthread.php?threadid=398129> [retrieved Mar. 26, 2009], Feb. 16, 2003, 10 pages.
"The Something Awful Forums—Leper's Colony," © 2008, Something Awful LLC, <http://forums.somethingawful.com/banlist.php?adminid=&actfilt=1&ban...> [retrieved Mar. 26, 2009], 3 pages.
"The Something Awful Forums—View SAclopedia Topic," © 2008, Something Awful LLC, <http://forums.somethingawful.com/dictionary.php?act=3&topicid=237> [retrieved Mar. 26, 2009], 2 pages.

*Primary Examiner*—James Trujillo
*Assistant Examiner*—William Spieler
(74) *Attorney, Agent, or Firm*—Christensen O'Connor Johnson Kindness PLLC (57) ABSTRACT

Generally described, a method and system for providing a flexible rule-based infrastructure for a self-policing discussion board is provided. More specifically, a method and system is provided for processing reports for messages posted in a discussion board and determining whether each report is accurate based on predetermined criteria. The predetermined criteria are defined by a set of report handling rules which evolve over time by learning from previously processed activity reports. The set of report handling rules also defines an appropriate action to take with regards to an accused message as response to the report when the predetermined criteria are satisfied.

20 Claims, 7 Drawing Sheets

FLEXIBLE RULE-BASED INFRASTRUCTURE FOR DISCUSSION BOARD MAINTENANCE

CROSS-REFERENCE TO RELATED APPLICATION

This application is a continuation of U.S. patent application Ser. No. 11/613,140, filed Dec. 19, 2006, the entire disclosure of which is hereby incorporated by reference herein.

BACKGROUND

Generally described, electronic discussion forums, which enable users to exchange information by posting messages, include discussion boards, Web forums, online message boards, bulletin boards, instant message forums, and chat room forums. The advantages of exchanging information through electronic discussion forums are numerous. For example, users can form communities, such as shared common interests communities or topic specific communities, and exchange ideas and opinions over discussion boards dedicated to the communities.

Many discussion boards implement some type of filtering on posted messages in order to prevent undesirable or offensive content from being posted. One common approach may be a self-policing system via abusive message reporting. In an abusive message report system, once a message is posted or remains posted in a discussion board, any user who feels that the message is not appropriate in light of common sense or the policies of the discussion board can report the message as an abusive one to human administrators of the discussion board. Currently, discussion boards are not regulated by the authorities for preventing malicious, abusive, or damaging messages.

Most discussion boards have a small number of human administrators who are in charge of managing the discussion board. Typically, these human administrators investigate the report and determine whether the reported message is in fact offensive in nature or violates the terms and conditions of the discussion board. However, as more people communicate and share their opinions over the Internet, discussion boards keep getting more popular and tremendous numbers of messages are posted on a daily basis over discussion boards. Accordingly, the number of abusive message reports also continues to grow. This becomes a burden for the human administrators since abusive message reports should be handled in a timely manner in order to maintain a healthy environment within the discussion boards.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, a method and system for providing a flexible rule-based infrastructure for a self-policing discussion board is provided. More specifically, a method and system is provided for processing reports for messages posted in a discussion board and determining whether each report is trusted based on predetermined criteria. The predetermined criteria are defined by a set of report handling rules that evolve over time by learning from previously processed reports. The set of report handling rules also defines an appropriate action to take with regard to the report or accused message when the predetermined criteria have been satisfied.

In an aspect of the present invention, a computer system for analyzing a list of aggregated activity reports within a discussion board is provided. The computer system comprises one or more databases for storing information related to users and information related to the activity report process and a computing device in communication with the databases. The information related to the activity report process may include a set of report handling rules, a list of activity reports, and an activity report history. After activity reports are received, the computing device, at a predetermined time, obtains the set of report handling rules and the list of activity reports from the data store. The computing system applies the obtained set of report handling rules to each activity report to determine whether the activity report is accurate. If the activity report is confirmed as accurate, the computing system identifies an action that is predefined to handle the activity report that is determined to be trusted and performs the identified action. For example, the computing device may remove the message accused by the activity report from the discussion board. If the activity report is determined to be inaccurate, the computing system ignores the activity report. If the activity report needs further review, the computing system adds the activity report to a queue for human processing. Subsequently, log information about the activity report is generated and added to the activity report history. In addition, the set of report handling rules is evaluated and dynamically updated based on the activity report history.

In another aspect of the present invention, a computer-readable medium having computer-executable components is provided. The computer-executable components include an evaluating component for processing an activity report to evaluate whether the activity report is accurate with respect to an accused message, and a rule management component for defining a set of report handling rules. The evaluating component applies the set of report handling rules to the activity report for processing the activity report, and determines the accuracy of the activity report. The evaluating component further identifies an action from a report handling rule that is defined as appropriate to process the activity report. The computer-executable components further include a processing component to execute actions on the activity report or the accused message. The rule management component updates the set of report handling rules based on accuracy of the processed activity report.

According to other aspects of the present invention, a computer-implemented method for managing a discussion board and discussion forum management system for enabling users to report undesirable messages are provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for providing a flexible rule-based infrastructure for a self-policing user-based submission forum. More specifically, embodiments of the present invention relate to a method and system for processing "activity reports" for messages posted in a discussion board and determining whether the activity reports are accurate based on predetermined criteria. An "activity report," as used herein, refers to a report that indicates a particular message posted in a discussion board as inappropriate in light of common sense and the policies of the discussion board. The predetermined criteria are defined by a set of report handling rules that evolve over time by learning from the previously processed activity reports.

The following detailed description describes illustrative embodiments of the invention. Although specific system configurations, screen displays, and flow diagrams are illustrated, it should be understood that the examples provided are not exhaustive and do not limit the present invention to the precise forms and embodiments disclosed. Persons skilled in the art will recognize components and process steps described herein that may be interchangeable with other components or steps, or combinations of components or steps, and still achieve the benefits and advantages of the invention.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

Figure 1:
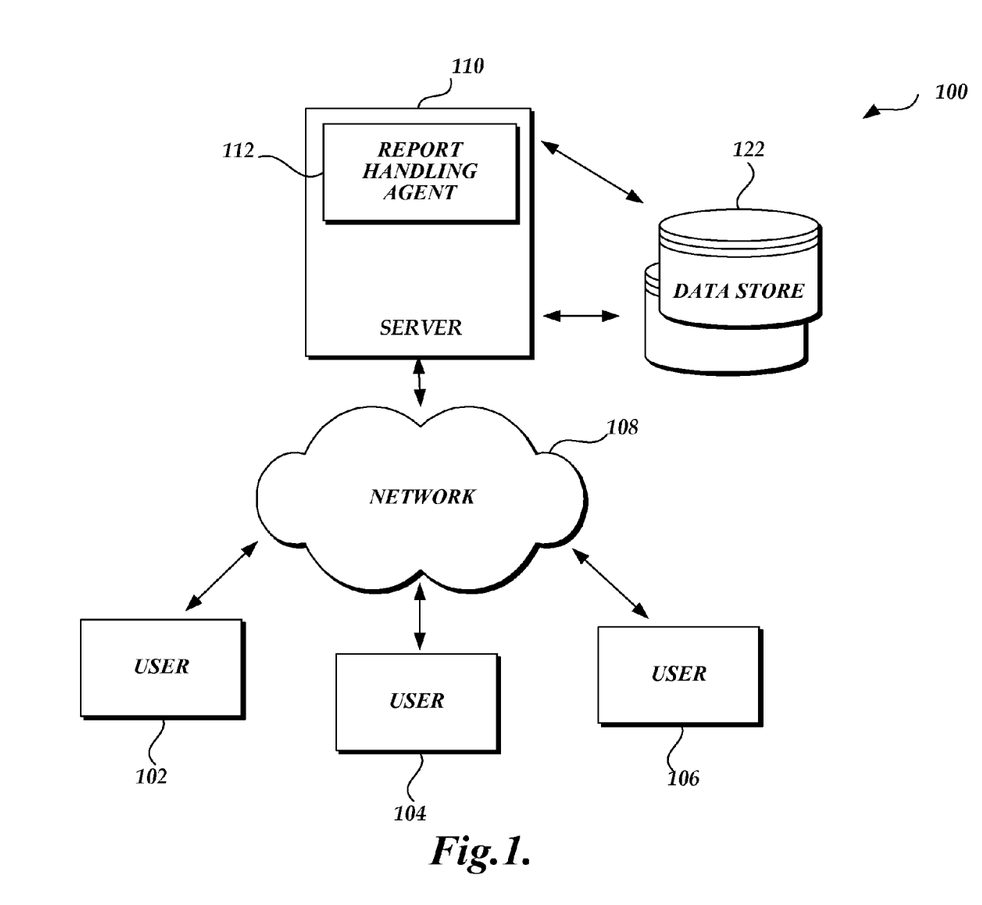
FIG. 1 is a pictorial diagram showing an illustrative computing environment in which embodiments of the present invention may be implemented.

FIG. 1 depicts an illustrative networked environment 100 suitable for processing activity reports submitted by users. Additionally, the illustrative networked environment 100 may facilitate electronic discussion forums, such as a discussion board, use group, bulletin board, Web forums, online message boards, bulletin boards, instant message forums, chat room forums, emails, etc. The illustrative networked environment 100 of FIG. 1 includes one or more user devices, such as user devices 102-106, by which a user (not shown) can interact with an electronic discussion forum server 110. The user devices 102-106 communicate with the electronic discussion forum server 110 via a communication network, such as the Internet 108. The user devices 102-106 are typically computing devices including a variety of configurations or forms such as, but not limited to, laptop or tablet computers, personal computers, personal digital assistants (PDAs), hybrid PDA/mobile phones, mobile phones, workstations, personal media players, and the like.

In FIG. 1, the server 110 may comprise one or multiple servers or discrete components to maintain discussion boards where users are allowed to view, post, and/or edit messages. As illustrated in FIG. 1, the server 110 may include a back-end component such as a report handling agent 112 for processing the submitted activity reports. The report handling agent 112 may be periodically invoked to process each activity report by applying a set of predefined report handling rules. If the report handling agent 112 determines that the activity report is to be ignored (e.g., because it is not accurate), the activity report will be discarded and log information will be generated accordingly. If the activity report is determined to be trusted (e.g., because it is accurate), an appropriate action defined in the report handling rules may be performed. For example, the message the report indicated as inappropriate will be removed from the discussion board and log information will be generated accordingly. It should be understood that the above-mentioned action (deleting the message from the discussion board) is described as exemplary and any suitable actions can be defined to handle the trusted activity report.

The server 110 may also include a central data store 122. The data store 122 provides data storage of various types of data, information, etc., and may be organized as desired, preferably using data structures optimized for maintaining messages in a corresponding community and identifying a set of rules for processing activity reports (a set of report handling rules). A data store, such as the central data store as used herein, is any type, form, and structure of storage in which data is maintained. For example, the data store may maintain data in a database form, such as a relational database, or as threaded messages. Any form, type, and structure may be used for maintaining electronic discussion messages in accordance with one or more embodiments of the present invention.

In one embodiment, the data store 122 may store aggregated activity reports, user profile information (e.g., user account information, reputation, credential, longevity of user account, user report history, etc.), a set of report handling rules, processing criteria, abuse category, activity report category, and the like. In an illustrative embodiment, the data store 122 may also contain one or more lists of activity reports which the server 110 previously processed and an activity report history of the previously processed activity reports. In some instances, the server 110 may maintain or monitor several discussion boards, each with a different policy. The set of report handling rules may be specific to each discussion board. In this embodiment, the set of report handling rules are specified in such a way that activity reports arising from a particular discussion board can be examined to determine whether the accused messages are undesirable for the particular discussion board under the given circumstances. In another embodiment, a set of report handling rules may not be specific to any particular discussion board and be used to process activity reports arising from any discussion board.

Figure 2:
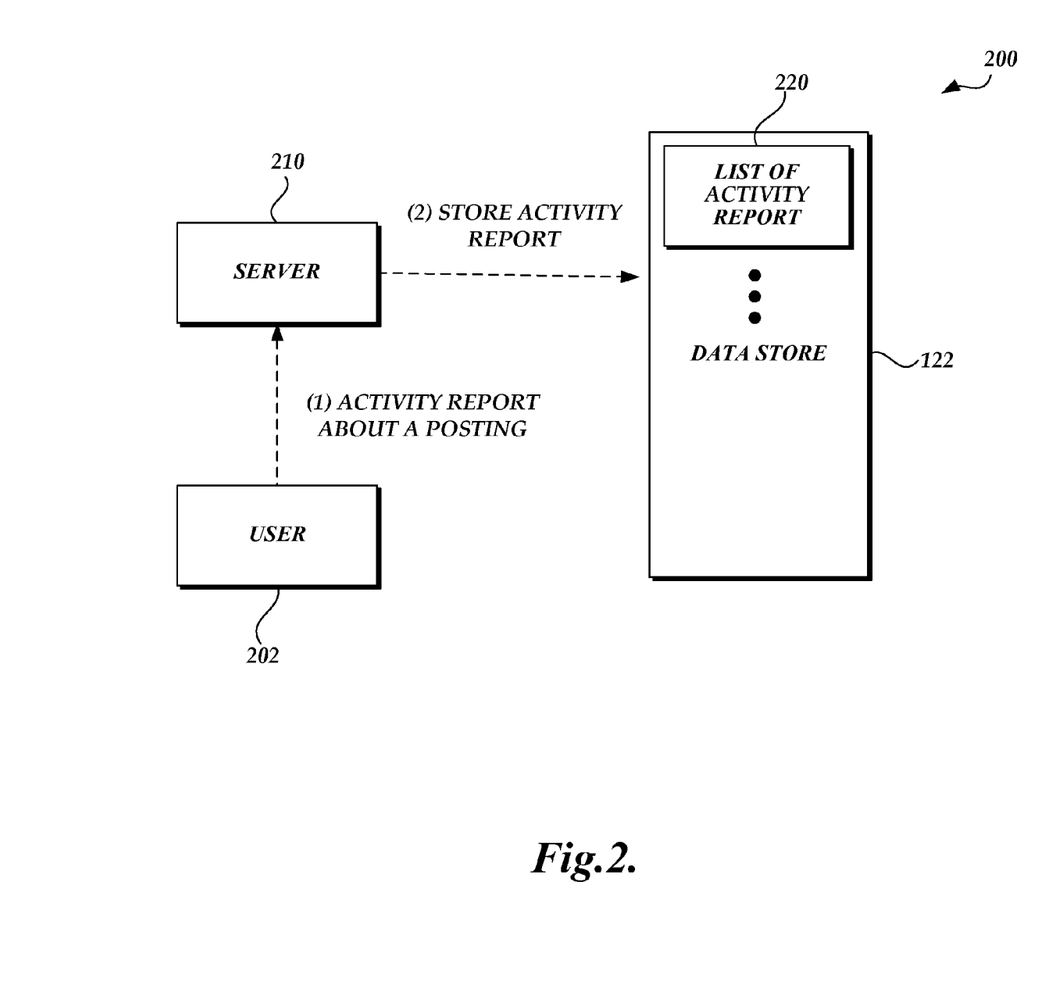
FIGS. 2-3 are pictorial diagrams showing interactions among various components in a discussion board server when users submit an activity report for a posting.
Figure 3:
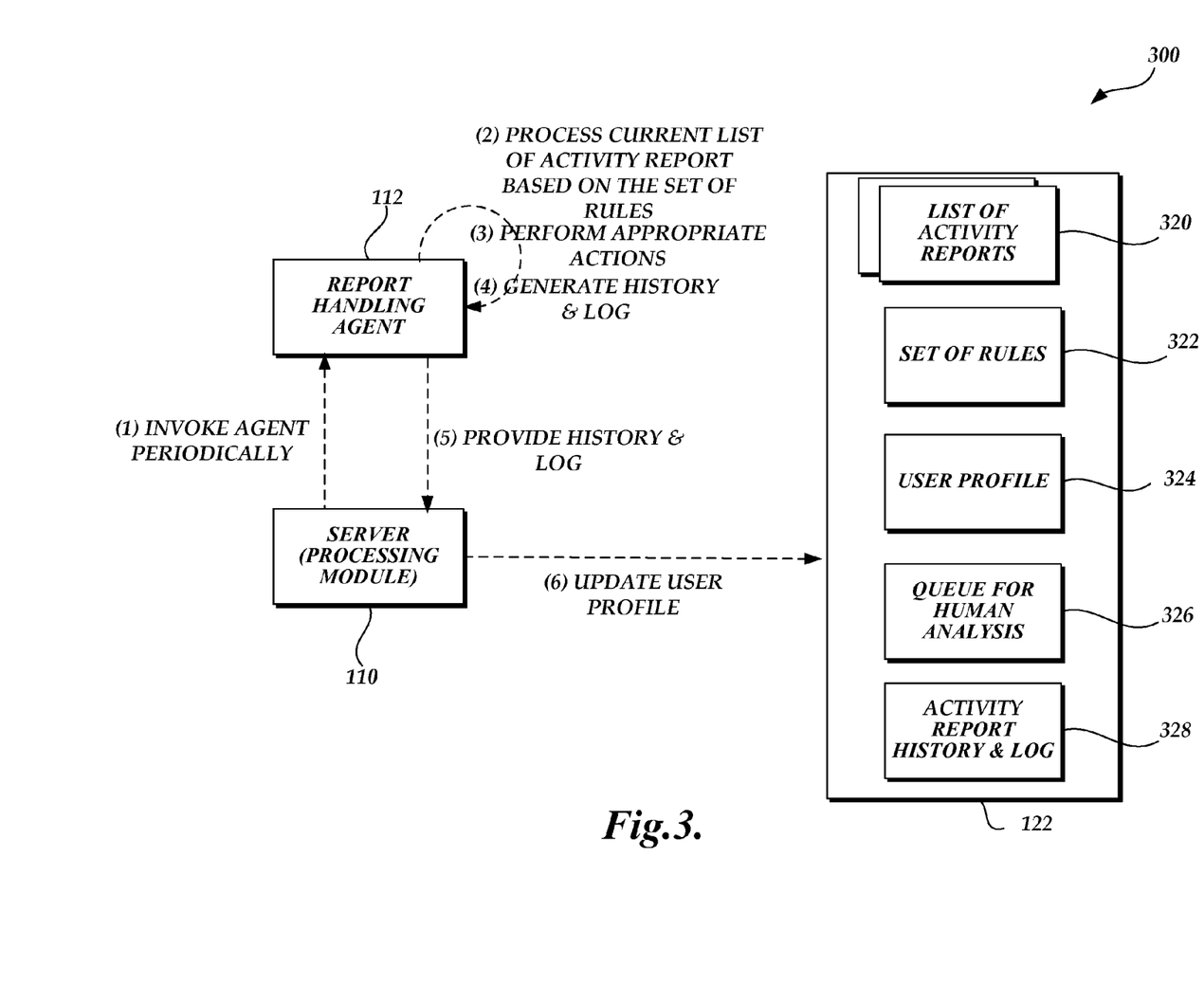

FIGS. 2-3 are pictorial diagrams illustrating interactions among various components in a server 110 when a user submits an activity report regarding a message found in a certain discussion board.

Referring now to FIG. 2, a user 202 submits an activity report to the server 110. Assume that the user 202 recognizes a message (posted by another user) which deems to be inappropriate in light of common sense or the terms and conditions of the discussion board where the message is posted. In one embodiment, when a user indicates that a message may be considered inappropriate, a user graphic interface dedicated to submitting an activity report may be provided to the user. For example, a user graphic interface corresponding to a format of an activity report may be provided to the user in order to collect the information necessary to process the activity report. The user 202 may fill in the form provided in the user graphic interface and submit the report via interaction with the user graphic interface. Upon receipt of the report, the server 110 aggregates the activity report into a list of activity reports stored in the data store 122.

As will be appreciated by one of ordinary skill in the art, within a self-policing discussion board, it is not uncommon that some users also abuse the reporting system by submitting false or malicious reports. Further, in some instances, users may make an inaccurate judgment as to what is an inappropriate message. Thus, it is important to screen (filter out) the activity reports that should be ignored. The aggregated reports may be periodically processed by the server 110 or by human administrators to determine whether the activity report is accurate.

Referring to FIG. 3, the server (processing module) 110 periodically invokes a report handling agent 112 to process the aggregated activity reports. As discussed above, a report handling agent 112 is a back-end component that is not visible to users and is configured to process each activity report submitted by users. The report handling agent 112 obtains a set of rules 322 defining criteria for determining whether an activity report is accurate or can be considered accurate and what actions are appropriate under the criteria. After being invoked, the report handling agent 112 obtains a current list of activity reports 320 from the data store 122. The aggregated activity reports, including activity reports submitted during a predetermined time period, are stored in the current list of activity reports 320. For each activity report in the current list of activity reports, the report handling agent 112 applies the obtained set of report handling rules to determine whether the activity report matches criteria defined by any of the report handling rules.

The report handling agent 112 may be configured to follow a thought process of a human administrator by first applying a subset of report handling rules that specifies criteria specific to a particular abuse message category of the report. For example, if the selected activity report is categorized as "swearing," a subset of report handling rules related to "swearing" may be identified and applied to the activity report first. Although a set of report handling rules can be applied in a specific order for efficiency, it is contemplated that each report handling rule from the set of report handling rules is applied to the activity report until a determination is made as to whether the activity report is considered to be accurate or not.

When activity reports are processed, a range of factors related to the activity report may also be considered. For example, the report handling agent 112 may take into account a range of diverse factors, such as the reputation of the "reporter user," the reputation of the "accused user," the content of the message, the longevity of both accounts, the accuracy of previous reports, the discussion board's policy, the disposition of previous reports submitted by the reporter user, etc. A "reporter user," as used herein, refers to a user who submits an activity report. An "accused user" refers to a user who posted a message that is accused by an activity report.

As will be appreciated by one of ordinary skill in the art, a determination as to whether the report is accurate is made when the criteria of at least one rule matches the range of factors related to the activity report. Likewise, if no rule (its criteria) matches the diverse factors related to the activity report, the activity report may need a closer review by a human administrator. After the determination is made, the activity report may be categorized as "ignored," "trusted," "indecisive," or a "logged" report, and actions appropriate to each category will be performed.

As will be discussed in greater detail below, a message that is accused as inappropriate by an "ignored" report will remain in the discussion board. The "ignored" report may be removed from the current list of activity reports, or marked as "handled." Likewise, a message that a "trusted" report indicates as inappropriate may be removed from the discussion board. An "indecisive" or "logged" report may be further reviewed by a human.

For each processed activity report, an action log (log information) may be generated to annotate the process of the activity report, including, but not limited to, executed action information, the reporter user's information, the accused user's information, the accused message, date/time information, etc. The action log may also summarize a series of actions executed on the activity report either by the report handling agent 112 or a human or both. For example, if the activity report was determined to be "indecisive" by the report handling agent 112 and was thereafter determined "ignored" by a human, the action log will contain a summary of the actions executed by the report handling agent 112 and the human. The generated action log may be stored as part of the activity report history. As shown, the action log indicates that the report handling agent 112 deleted a message that was reported as a "hate" message. In some cases, based on the action log, a human administrator can review the accused message and the activity report and take additional actions. For example, a deleted message may be reposted if the deletion was determined to be in error.

In an aspect of the present invention, the report handling agent 112 may have a training probabilistic and feedback element so that some processed activity reports can be reexamined by a human in order to tune the set of report handling rules, to change the result of the report handling, or the like. One example may be sampling the processed activity report for reexamination. In one embodiment, the activity report history may be utilized. Some activity report history may be reviewed to evaluate the set of report handling rules that were applied to the activity reports. The result of such reexamination done by a human administrator and the action logs stored in the activity report history may be compared to identify problems in the set of report handling rules. Subsequently, the set of report handling rules may be updated to address the identified problems. In addition, some activity reports are randomly selected for review by a human administrator. Such selected activity reports may be stored in a queue for human analysis 326. After the activity reports are reevaluated, log information about the reevaluation may be annotated, including executed action information, date/time information, etc., and subsequently stored in the activity report history 328.

In this manner, the report handling agent 112 can be trained over time, which may reduce the chance that users realize that automation is in place. It is to be noted that any suitable training probabilistic and feedback element may be used to allow the report handling agent 112 to be evolved (trained).

As will be discussed in greater detail below, the server 110 may update user profile information 324 based on the activity report history 328. For example, if a user has submitted several "ignored" activity reports, the user's accuracy rate may be downgraded. Likewise, if a user has posted several messages that have been deleted from the discussion boards, the user's reputation may be adjusted based on the activity report history 328.

Figure 4:
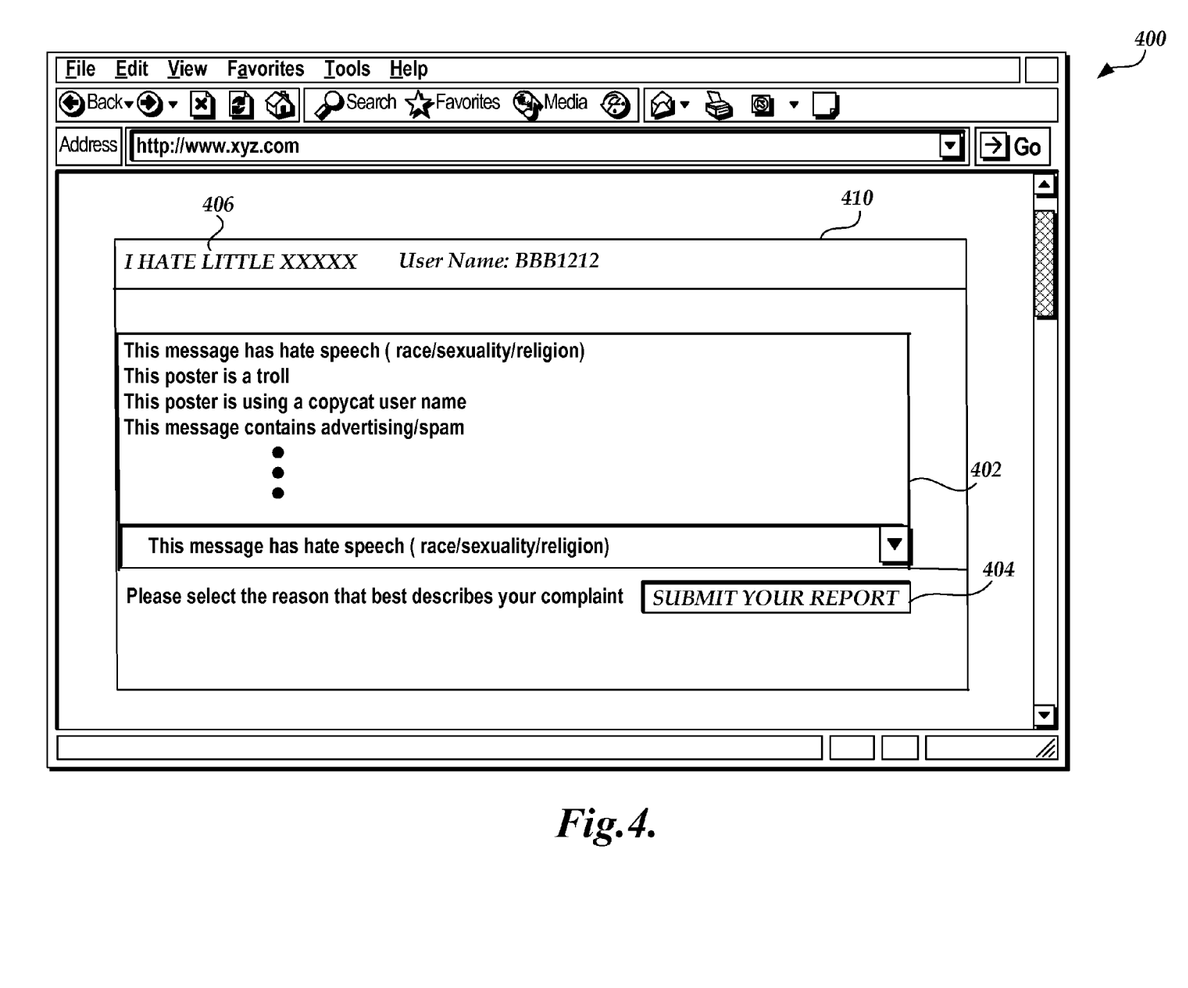
FIG. 4 is a pictorial diagram of an exemplary screen that displays a user interface where a user can report an inappropriate message to the discussion board server.

Referring to FIG. 4, an exemplary screen display 400 depicts an inappropriate message report window 410 providing a graphic interface to a user, which is utilized for creating or editing an activity report in accordance with one or more embodiments of the present invention.

For the purpose of discussion, assume that a user has previously recognized a message with a subject of "I HATE LITTLE XXXX" posted by another user, "BBB1212," as a hate speech. Once the user chooses to report this message for its undesirable content, an inappropriate message report window 410 may be populated to assist the user to create an activity report in a proper format. In one embodiment, within the inappropriate message report window 410, the user may be given a list of abuse message categories for convenience. As shown, the list of abuse message categories 402 may include selections such as "This message has hate speech (race/sexuality/religion)," "This poster is a troll," "This poster is using a copycat user name," "This message contains advertising/spam," etc. If the user cannot find a proper abuse message category for the activity report, the user may be able to input a description of the activity report, such as "previously reported message." After the user inputs an abuse message category and indicates to submit, an activity report is created including the relevant information necessary for the server 110 to make a correct judgment on the activity report.

Thus, in this example shown in FIG. 4, after the user selects "this message has hate speech" from the list of abuse message categories 402 and presses a submit button 404, an activity report is created, including the "I HATE LITTLE XXXX" message, accused user information ("BBB1212"), reporter user information ("BlueBlue"), the selected category ("hate"), date/time information, discussion board name, etc. Subsequently, the server 110 receives the activity report and adds the activity report into the current list of activity reports in the data store 122.

In one embodiment, a server 110 may have predefined abuse message categories for efficient handling of the activity reports. The abuse message categories can be defined in various ways but generally represent the policies of the discussion board or the corresponding community. One exemplary list of abuse message categories includes, but is not limited to, "hate," "advertisement," "piracy," "pornographic," "libel," "chain message," "trolling," "legal," "swearing," "terms and conditions," etc. It is to be understood that each abuse message category can have subcategories and may be associated with keywords that are self-explanatory of the abuse category. For example, "terms and conditions" may have subcategories of "multiple accounts," "impersonation," etc., if the discussion board does not allow a single user to have multiple accounts. In this manner, the activity report can be grouped based on the abuse category (subcategory) and report handling rules specific to the abuse category can be applied first.

Figure 5:
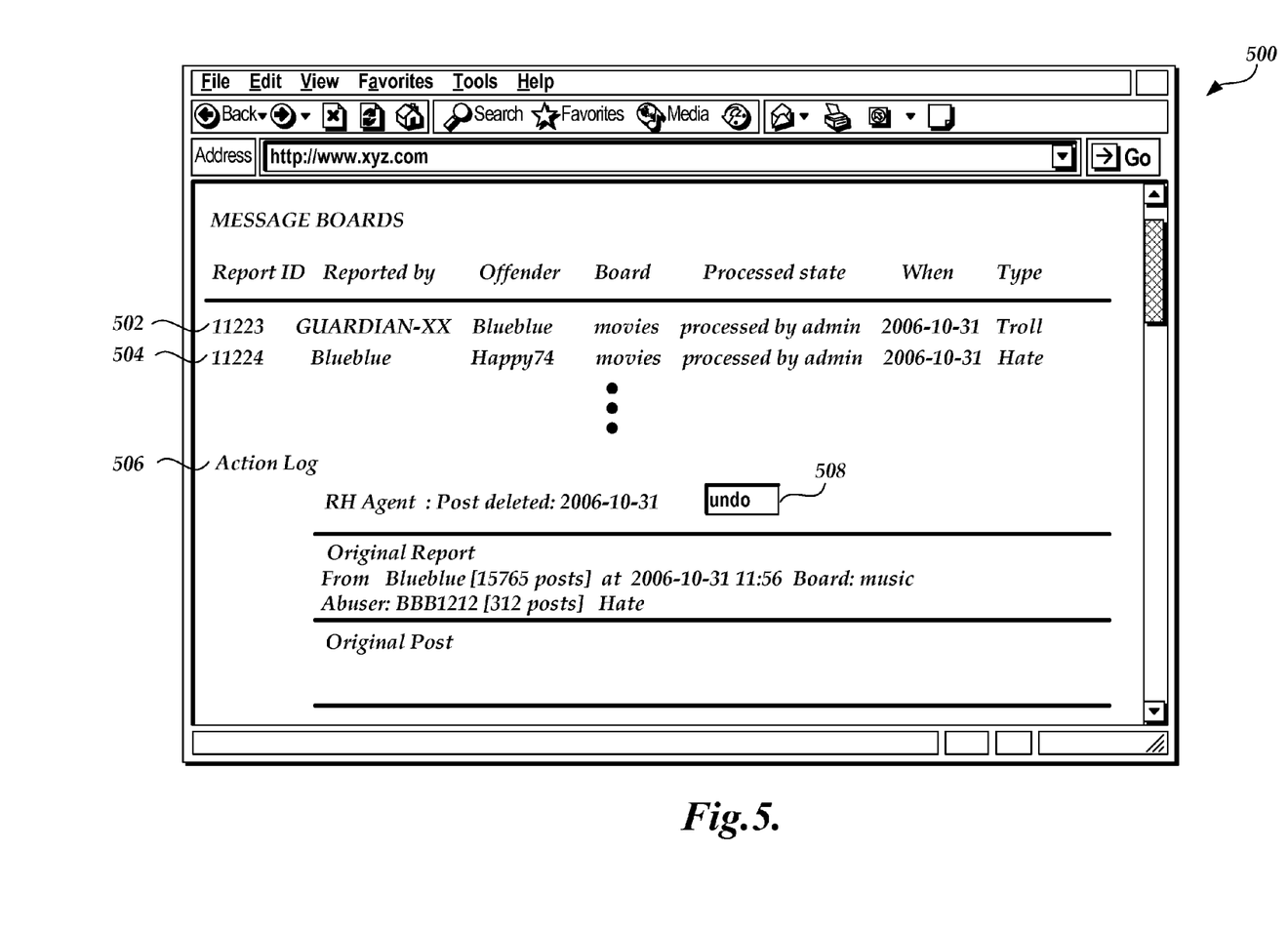
FIG. 5 is a pictorial diagram of an exemplary screen that displays an activity report history in accordance with an embodiment of the present invention.

Referring to FIG. 5, a pictorial diagram illustrates an activity report history window 500 in accordance with embodiments of the present invention. As with FIG. 4, assume that a reporter user has reported that a message posted by "BBB1212" on a music board is a "hate" message. Assume further that the report handling agent 112 has found that the activity report submitted by the reporter user is a trusted report. Since the activity report is found to be trusted, an appropriate action may be identified in the set of report handling rules. In some instances, the message posted by "BBB1212" may be edited not to contain any keywords indicating "hate." Alternatively, a warning notification may be sent to "BBB1212," advising to edit or delete the message. In the example as shown in FIG. 5, the message posted by "BBB1212" is removed from the music discussion board. Subsequent to the actions (deleting or editing of the message, trusting the activity report, sending a notification, etc.) being executed on the activity report, the applied report handling rules (e.g., identifiers of rules) and other relevant information are annotated and added in an action log 506. The action log 506 is stored in the activity report history. As shown in FIG. 5, the action log 506 also contains the original report, the original message, executed action (message deleted, report ignored, report indecisive, etc.), date/time information, user profile information, etc. In this exemplary screen 500, an "undo" button 508 is provided for an action log. A human administrator can "undo" the executed action if the activity report is determined to be improperly handled. A list of processed report items 502, 504 including a report identifier, reporter user's account, accused user's account, processed state, discussion board, category, date/time, etc., are also presented within the exemplary screen 500. Each processed report item 502, 504 may be selected by a user within the activity report history window 500. The corresponding action log may be populated.

Figure 6:
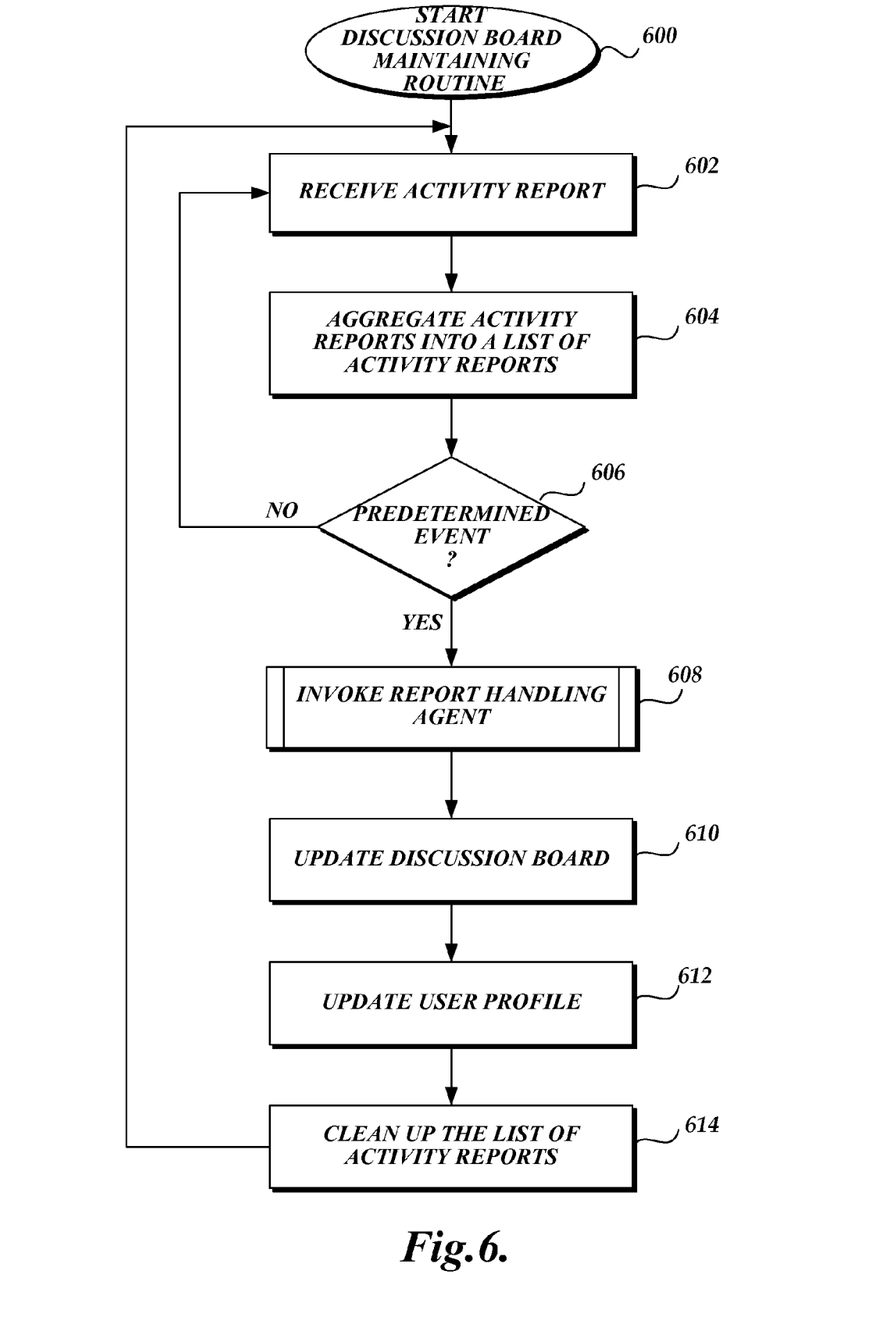
FIG. 6 is a flow diagram for a discussion board maintaining routine for receiving activity reports and updating the discussion board in accordance with an embodiment of the present invention.

Referring to FIG. 6, a flow diagram is depicted for a discussion board maintaining routine 600 for receiving activity reports and updating the discussion board in accordance with embodiments of the present invention. For the purpose of discussion, assume that the server 110 maintains several discussion boards and a set of report handling rules have previously been defined. Assume further that the server 110 aggregates activity reports that arise from the several discussion boards into one list of activity reports. The set of report handling rules, user profile information, and other information are stored in the data store 122 coupled to the server 110.

At block 602, one or more activity reports are received from users. As with FIG. 4, when a user indicates that a message can be considered to be inappropriate, a user graphic interface dedicated to submitting an activity report may be provided to the user. The user may select a category of the report by choosing a menu selection provided by the server 110. When an activity report is generated based on user interaction with the graphic user interface, additional information necessary to process the report is collected, which may include reporter user's information and accused user's information, etc. For example, a reputation level, longevity of the account, number of postings, number of reports, number of ignored reports, etc., may be collected from the user profile information of the reporter user and/or the accused user. The activity report also may include an original message, type (category) of abuse, description of abuse, date/time information, and the like. At block 604, the received reports and the collected information are aggregated into a list of activity reports.

At decision block 606, a determination is made as to whether a predetermined event is triggered to invoke a report handling agent 112 to process aggregated activity reports. A predetermined event may be triggered, for example, when a certain number of messages in a specific abuse category have been reported, when a known abusive user's messages have been reported, a total number of activity reports have reached a threshold number, etc.

In one embodiment, the report handling agent 112 may also be invoked at a predetermined time. In order to provide an illusion that no automated report handling is in place, the report handling agent 112 may mimic a human administrator's behavior in a discussion board. Since it may take some time for human administrators to process activity reports, spontaneous processing may not be desirable. The predetermined time to invoke the activity report handling agent 112 may be also adjusted, for example, based on the amount of activity reports received. It is to be understood that the report handling agent 112 can be invoked as appropriate, for example, when a number of reports aggregated in the list of activity reports reaches a triggering number, or the like.

Figure 7:
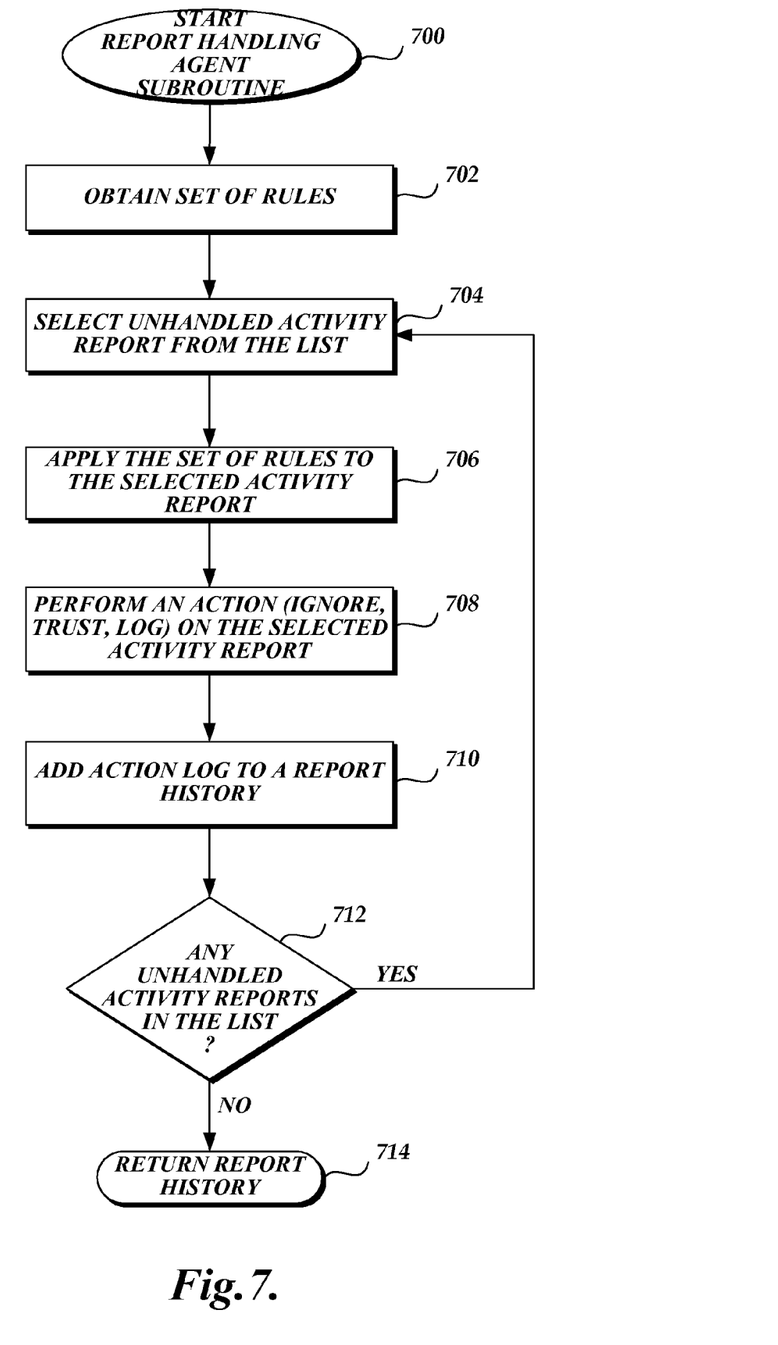
FIG. 7 is a flow diagram for a report handling agent subroutine in accordance with an embodiment of the present invention.

If it is determined that the predetermined event to invoke the report handling agent 112 is triggered, at block 608 the server 110 invokes (wakes up) the report handling agent 112, which will process a current list of activity reports via a subroutine 700 (FIG. 7). After the current list of activity reports has been processed, at block 610 the discussion board may be updated to reflect the processing result from the subroutine 700. Further, the user profile information of each reporter user and/or accused user may be updated at 612. In one embodiment, the server 110 may maintain the user profile information, including, but not limited to, reputation information such as an "accuracy rate," "trust level," etc., for each user. An "accuracy rate," as used herein, refers to a ratio of the number of reports that have been found to be "trusted" over a total number of submitted reports. The "trust level" of a user may be determined based on previous actions that human administrators have applied to the user. For example, if the report submitted by a user is determined to be ignored by a human administrator, the trust level of the user may be downgraded. For another example, if the message posted by a user is determined to be inappropriate by a human administrator, the "trust level" of the user may be downgraded. Other information, such as number of messages vs. deleted messages, a period of inactivity of the account, total number of deleted messages, etc., may be included in the user profile. In this manner, several different reputation factors can be considered when an activity report is processed.

At block 614, the server 110 may check through the list of activity reports that have been processed by the report handling agent 112 and delete old reports that have been processed but are waiting for reexamination. As mentioned above, if necessary, indecisive reports and logged reports may be reevaluated by a human administrator. Once the reports are reexamined, the reexamined reports are deleted from the list of activity reports. As with the report handling agent 112, log information relating to the reexamination may be annotated, including executed action information, date/time information, etc., and stored in the activity report history.

In one embodiment, the report handling rules may be dynamically updated by a learning process resulting from recognizing inaccuracies in processing of activity reports. The accuracy in processing of activity reports may be determined or measured based on the difference between the report handling agent's judgment and a human's judgment on the activity reports.

For example, a small number of the activity reports that have been processed may be sampled and reevaluated by a human to check the effectiveness of the set of report handling rules. As mentioned above, sampling can be done in any manner as long as problems of the report handling rules can be identified. In this example, the activity report history may be utilized. The results of the reexamination and the action logs stored in the activity report history may be compared to identify problems of the report handling rules. In this manner, the report handling agent 112 can change its behavior over time due to the dynamically updated report handling rules, which may reduce the chance that users will realize that automation by the report handling agent 112 is in place. The routine 600 returns to block 602 and repeats the above-mentioned steps.

Referring to FIG. 7, a flow diagram is illustrated for an activity report handling agent subroutine 700 in accordance with embodiments of the present invention. Beginning at block 702, the report handling agent 112 may obtain a set of report handling rules for processing the current list of activity reports. In one embodiment, the set of report handling rules may specify criteria for "ignored," "trusted," "indecisive," and "logged" reports based on the original message, information about the reporter user, information about the accused user and/or other factors relevant to the report. In a particular embodiment, a rule specifies that if an activity report is submitted by a user whose previous activity report was already "ignored" by a human administrator, the activity report is determined to be an "ignored" report and deleted from the current list of activity reports. In this example, the report handling agent 112 may obtain the user profile information of the reporter user and determine whether the activity report submitted by the reporter user has previously been ignored by human administrators. Another rule specifies that if an activity report is submitted by a reporter user who has a very low accuracy rate, the activity report is to be ignored. In this example, the report handling agent 112 may obtain the accuracy rate of the reporter user from user profile information. As mentioned above, the age of an account may be considered as a factor to determine whether the activity report is accurate. For example, if a user has recently created a new account with the discussion board, the user's trust level or accuracy rate can not be determined. The server 110 may have a rule specifying that if an activity report is submitted by a reporter user with a new account, such activity report is to be ignored. The report handling agent 112 may also consider that messages posted by a user with a high trust level have a good chance of being legitimate and any report against such a message has a good chance of being inaccurate. Likewise a rule may specify that if an activity report is submitted by a reporter user with a high trust level, the activity report may be considered "trusted," and perform appropriate actions including, but not limited to, deleting the message which the activity report is directed to.

In some cases, various reputation factors of the reporter user and the accused user may be weighted and cross-compared to determine whether the activity report is to be ignored. A user with a high trust level may be trusted more than other users with short histories with the discussion board. The server 110 may have a rule specifying that if a new user, without much history, submits an activity report against a user with a high trust level, such report is to be ignored. In addition, a certain user may be selected as a "trusted accurate user" or "super user," based on various reputation factors, and some activity reports submitted by such a user will be automatically trusted and an appropriate action may be performed. For example, the accused message may be removed from the board. The server 110 may have a rule that may specify that if user reputation factors of the reporter user match the criteria for a "trusted accurate user," the activity report will always be trusted. This rule may be applied as a last step while the activity report is being processed. In this manner, "indecisive" reports submitted by a "trusted accurate user" will always be trusted and the number of activity reports that a human administer has to reexamine will be reduced.

At block 704, the report handling agent 112 may select from the activity report list an activity report that has not been marked as "handled." At block 706, the obtained set of report handling rules may be applied to the selected activity report. If the criteria specified by a rule match the selected activity report and other factors related to the activity report, an action specified by the rule may be identified. The identified action may be "trust," "ignore," "log," action, etc., and the activity report may be categorized accordingly. If no criteria specified by the report handling rules match the selected activity report and other factors related to the activity report, the activity report may be categorized as an "indecisive" report. At block 708, the identified action may be performed on the activity report. For example, if the identified action is a "trust" action, the activity report is trusted and the message is deleted from the discussion board. As will be appreciated by one of ordinary skill in the art, the "trust action" can be defined in various ways, as appropriate, in the report handling rules. In some instances, if the identified action is a "trust" action, the activity report is trusted and the accused message may be edited based on the activity report. In some other instances, before the report handling agent deletes the accused message, the report handling agent may send a warning notification to an accused user, advising the accused user to edit or delete the accused message. Based on other relevant factors, the accused user may be suspended from posting messages in the discussion board or the account of the accused user with the server may be canceled.

If the identified action is an "ignore" action, the activity report is ignored and the activity report is deleted from the list. As a result, the reported message remains within the discussion board. Further, if the identified action is a "log" action, the activity report is logged and the activity report may remain in the activity report list. Some of the "logged" report may be reviewed by a human administrator. In one embodiment, if the activity report is categorized as an "indecisive" report, the activity report may be placed in a queue for a human administrator's review. After performing the identified action, the activity report may be marked as "handled."

At block 710, an action log (log information) related to the activity report may be generated and added to the activity report history. As mentioned above, the action log may include information relevant to the process of the activity report. At decision block 712, a determination is made as to whether there are any activity reports that have not been processed (i.e., marked as "handled"). If it is determined that there is an activity report that has not been processed, the subroutine 700 returns to block 704 and repeats the above-mentioned steps until all activity reports are processed (run through the set of report handling rules). If it is determined that all activity reports in the current list of activity reports have been processed (handled), the subroutine returns the activity report history and completes at block 714.

Although the aforementioned examples are discussed in conjunction with discussion boards, it is to be understood that the routines 600 and 700 can be implemented within other user-based submission forums available in the Internet, such as a review forum, a chat room, a collaborative publication forum, instant message forums, blog forums, etc. Alternatively, the routines 600 and 700 can be implemented within any online commutation environments such as email service environments, etc. It is also to be understood that the set of report handling rules may be updated through reevaluation of the set of report handling rules. A new rule can be identified based on the previously processed reports and added to the set of report handling rules. As mentioned above, human administrators may select a subset of processed activity reports and reexamine the selected processed activity reports to identify possible problems or loopholes in the set of report handling rules. Based on the reexamination, the set of report handling rules may be updated to process activity reports more effectively with a high level of accuracy. The discussion board and the user profile may also be updated based on the reexamination.

Additionally, it is contemplated that after an active report is processed, any additional actions can be executed, for example, issuing a warning notification to a user whose message is found as inappropriate, canceling an account if the user's reputation level is unacceptably low, limiting the user's access to a certain discussion board, etc. In one embodiment, a daily or weekly status report may be generated to summarize report handling activities within a discussion board.

While illustrative embodiments have been illustrated and described, it will be appreciated that various changes can be made therein without departing from the spirit and scope of the invention.

The embodiments of the invention in which an exclusive property or privilege is claimed are defined as follows:

1. A discussion forum management system for enabling users to report undesirable messages, the discussion forum management system comprising:
   a user interface component configured to use one or more computing devices to cause one or more messages posted within a discussion forum to be displayed and to receive an activity report from one or more users via user interactions, the activity report identifying an undesirable message and an abuse category of the undesirable message;
   a processing component configured to use one or more computing devices to aggregate the received activity report into a current list of activity reports; and
   a report handling component configured to use one or more computing devices to apply a set of report handling rules to the current list of activity reports at a predetermined time of day, the set of report handling rules specifying criteria specific to a category that is assigned to the activity report.

2. The discussion forum management system of claim 1, wherein the category assigned to the activity report is one of a trusted report, an ignored report, an indecisive report, or a logged report.

3. The discussion forum management system of claim 2, wherein if the activity report matches criteria of a trusted report, the report handling component is configured to perform an action specified in the set of report handing rules.

4. The discussion forum management system of claim 3, wherein the action is at least one of deleting from the discussion forum the undesirable message, editing the undesirable message, sending to a user who posted the undesirable message a warning about the undesirable message, or canceling an account of the user who posted the undesirable message within the discussion forum.

5. The discussion forum management system of claim 2, wherein if the activity report matches criteria of an ignored report, the activity report is deleted from the list of the activity reports.

6. The discussion forum management system of claim 2, wherein if the activity report matches criteria of an indecisive report, the activity report is marked for evaluation by a human administrator.

7. The discussion forum management system of claim 2, wherein the report handling component is further configured to generate an activity report history after applying the set of report handling rules to an activity report from the current list of activity reports.

8. The discussion forum management system of claim 1, wherein the processing component is further configured to sample a set of activity reports which have been processed by the report handing component and reevaluate the sampled set of activity reports.

9. The discussion forum management system of claim 8, wherein the processing component is configured to identify a problem in the set of report handling rules.

10. The discussion forum management system of claim 9, wherein the processing component is configured to identify one or more new rules to address the identified problem.

11. The discussion forum management system of claim 10, wherein the processing component is configured to modify the set of report handling rules in accordance with the one or more new rules.

12. The discussion forum management system of claim 1, further comprising a storage component configured to use one or more computing devices to store the current list of activity reports and the set of report handling rules.

13. A non-transitory computer-readable medium having computer-executable components stored thereon that are configured to enable one or more processors of a computer system to process an activity report to determine an accuracy of the activity report, the computer-executable components comprising:

an evaluating component configured to process an activity report at a predetermined time of day to determine whether the activity report is trusted with respect to an accused message; and a rule management component configured to define a set of report handling rules and update the set of report handling rules based on an accuracy of the processed activity report;

wherein the evaluating component is configured to apply the set of report handling rules to the activity report as it processes the activity report.

14. The computer-readable medium of claim 13, wherein the evaluating component is configured to identify an action from a report handling rule and to execute the identified action with respect to an activity report.

15. The computer-readable medium of claim 14, wherein the evaluating component is configured to generate log information relating to each processed activity report.

16. The computer-readable medium of claim 14, wherein the log information relating to each processed activity report includes reputation factors of a user who submitted the activity report.

17. The computer-readable medium of claim 16, wherein the reputation factors include an accuracy rate that is determined by the rule management component and a trust level that is received from a human administrator.

18. The computer-readable medium of claim 16, wherein the reputation factors include a longevity of an account of the user who submitted the activity report.

19. The computer-readable medium of claim 13, wherein the evaluating component is configured to determine whether the activity report is trusted with respect to the accused message based on reputation factors of a user who posted the accused message.

20. The computer-readable medium of claim 19, wherein the reputation factors include a longevity of an account of the user who posted the accused message.

* * * * *

UNITED STATES PATENT AND TRADEMARK OFFICE
CERTIFICATE OF CORRECTION

| | |
|---|---|
| PATENT NO. | : 7,840,576 B1 |
| APPLICATION NO. | : 12/756112 |
| DATED | : November 23, 2010 |
| INVENTOR(S) | : H. B. Siegel et al. |

It is certified that error appears in the above-identified patent and that said Letters Patent is hereby corrected as shown below:

| COLUMN | LINE | ERROR |
|---|---|---|
| 12 | 42 | "report handing" should read --report handling-- |
| (Claim 3, | line 4) | |
| 12 | 66 | "report handing" should read --report handling-- |
| (Claim 8, | line 4) | |

Signed and Sealed this
Twenty-eighth Day of June, 2011

David J. Kappos
*Director of the United States Patent and Trademark Office*